V. STASCH.
SAFETY APPARATUS FOR MINERS' TRUCKS.
APPLICATION FILED AUG. 24, 1911.

1,019,281. Patented Mar. 5, 1912.

Witnesses:

Inventor:
Valentin Stasch

UNITED STATES PATENT OFFICE.

VALENTIN STASCH, OF FRIEDENSHÜTTE, GERMANY, ASSIGNOR OF ONE-HALF TO THE FIRM OF GRÄFLICH SCHAFFGOTSCH'SCHE WERKE, G. M. B. H., OF BEUTHEN, GERMANY.

SAFETY APPARATUS FOR MINERS' TRUCKS.

1,019,281.  Specification of Letters Patent.  Patented Mar. 5, 1912.

Application filed August 24, 1911. Serial No. 645,889.

*To all whom it may concern:*

Be it known that I, VALENTIN STASCH, a subject of the German Emperor, and resident of Friedenshütte, Germany, have invented certain new and useful Improvements in Safety Apparatus for Miners' Trucks, of which the following is a specification.

This invention relates to an improved safety-apparatus for miners' trucks, particularly for those used on inclined planes in mines. Normally, said safety-apparatus allows an unobstructed running of the trucks in upward and downward direction. As soon as, however, the rope of a truck breaks and the latter runs therefore down with great velocity, a tappet, which by a connecting-rod is pivotally connected with a double-armed weighted abutment-lever, is, by the quick rotation of the latter caused by the quick downward movement of the truck, also quickly turned, whereby a catch-lever, which is movably located on the axle of said tappet, is thrown into catching position, in which it catches the front axle of the truck or another abutment. The one-armed catch-lever and the angle-lever operating the latter by a connecting-rod can be separated from each other for any suitable local distance, so that a catching of ropeless trucks is insured at any inclination of the plane on which the truck runs. The whole arrangement can be constructed as a rail brake and adapted to be shifted in longitudinal direction. Also, other appropriate braking means may be employed in order to prevent a sudden stopping of the truck. As the front axle of the car is caught, it might happen that the truck would turn over. To prevent this, a beam or the like may be arranged on the roof for this purpose.

Figure 1:
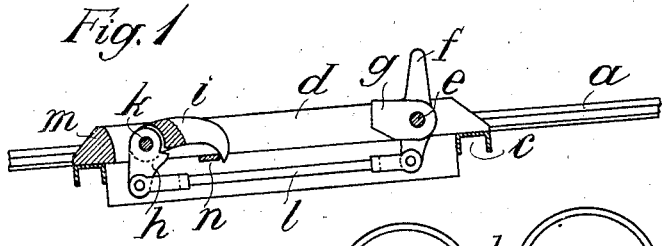
Figure 2:
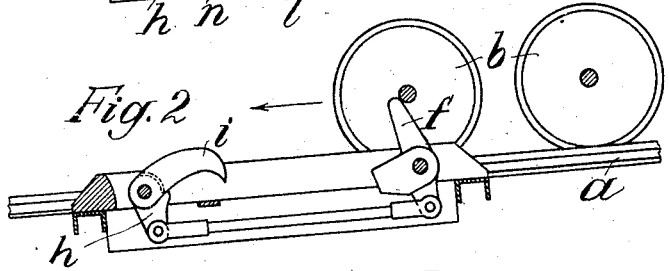
Figure 3:
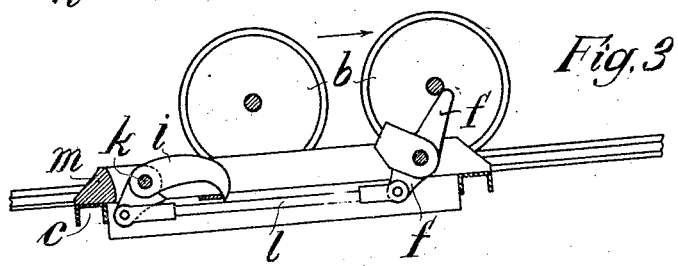
Figure 4:
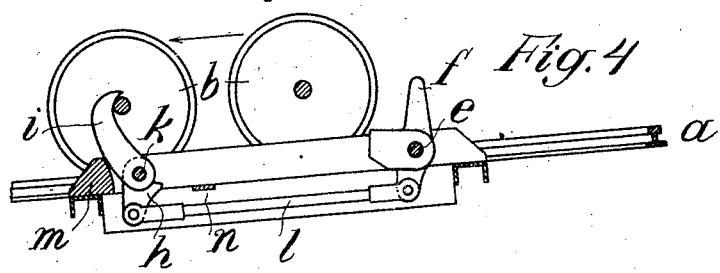
Figure 5:
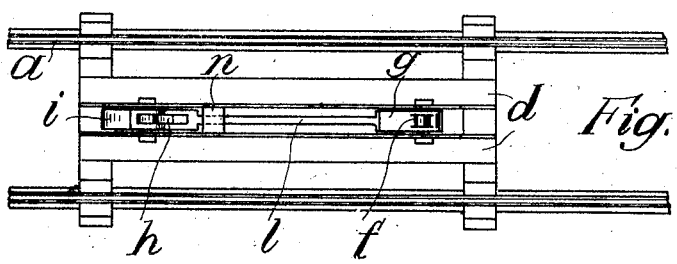

In the accompanying drawing, Figure 1 is a side view of the safety-apparatus in its position ready for use, Figs. 2 to 4 show, in similar views of the apparatus, the swinging of the angle-lever on a downward run of the truck, the swinging of the angle-lever on an upward run of the truck, and the catching of the truck respectively, while Fig. 5 is a plan view of Fig. 4.

Between the rails $a$ for the wheels $b$ of the truck, the safety-apparatus is arranged on angle-iron bars $d$ fixed on the sleepers $c$. On the axle $e$ the double-armed angle-lever $f$ is movably mounted and fitted with a counterweight $g$. The catch-lever $i$ is movably mounted on the axle $k$ of the tappet $h$, which carries a projection positioned beneath the catch-lever $i$. The tappet $h$ and the double-armed lever $f$ are pivotally connected by a rod $l$. The two angle-iron bars $d$ have a transverse member $m$ on which in catching position the catch-lever $i$ is adapted to rest (Fig. 4). In normal position, the catch-lever $i$ rests on a bar $n$ or any other abutment.

In normal working, when the truck moves downward (Fig. 2), the lever $f$ is turned when passed by the wheel axles. The swinging-back of the lever into its position of rest is effected automatically by action of the catch-lever $i$ which serves then as a counterweight. On the other hand, when the truck moves upward (Fig. 3), again a turning of the lever $f$ is effected by the wheel axles, its swinging-back being then effected by the counterweight $g$. As soon as, however, a truck becomes ropeless, the lever $f$ (Fig. 2) is caused to swing violently, so that through the tappet $h$, which is thus also quickly turned, the catch-lever $i$ is thrown into its catching position (Fig. 4), in which it rests against the abutment $m$, and the front wheel axle is caught by the same.

Obviously, instead of the wheel axle, another abutment on the truck may be used for being caught by the catch-lever, this being clear without further illustration.

I claim:

A safety-apparatus for miners' trucks to be run on inclined planes, adapted to be arranged between the rails on which the trucks are run, comprising in combination, a double-armed swing-lever adapted to project with its upper arm into the way of the wheel axles of the truck, an axle arranged at a distance from said swing-lever, a fixed tappet on said axle having a projection, a rod to connect said tappet and the lower arm of said swing-lever, a counterweight for said swing-lever adapted to bring the same back into its normal position when moved in the normal working of the trucks on the upward run of same, a catch-lever movably arranged on said axle and designed to serve as counterweight for said lever upon the latter being moved in the normal working of the trucks on the downward run of same but to be thrown by the projection of said tappet into its catching position for arresting said truck when the latter becomes ropeless, and an abutment for securing said catch-lever in its catching position, substantially as and for the purpose set forth.

In testimony whereof I have hereunto set my hand, in the presence of two subscribing witnesses.

VALENTIN STASCH.

Witnesses:
 ERNST KATZ,
 ERNST BLEISCH.